United States Patent [19]
Richter

[11] 3,752,319
[45] Aug. 14, 1973

[54] STRAINER DEVICE IN A CONTINUOUS CELLULOSE DIGESTING PLANT

[75] Inventor: Ole J. Richter, Karlstad, Sweden

[73] Assignee: Kamyr Aktiebolag, Karlstad, Sweden

[22] Filed: Sept. 20, 1971

[21] Appl. No.: 181,773

[30] Foreign Application Priority Data
Sept. 24, 1970 Sweden.............................. 12997/70

[52] U.S. Cl..................... 210/357, 210/391, 210/413
[51] Int. Cl............................................. B01d 33/22
[58] Field of Search.................... 210/357, 391, 392, 210/413

[56] References Cited
UNITED STATES PATENTS

| | | | |
|---|---|---|---|
| 1,708,817 | 4/1929 | Winger | 210/357 X |
| 2,391,704 | 12/1945 | Hughes | 210/173 |
| 891,271 | 6/1908 | Ljungstrom | 210/357 |
| 1,877,449 | 9/1932 | Fulcher | 210/357 |
| 1,874,126 | 8/1932 | Schofield et al. | 210/357 X |
| 2,269,031 | 1/1942 | MacArthur | 210/357 |
| 3,584,743 | 6/1971 | Dinges | 210/357 X |

Primary Examiner—John Adee
Attorney—Cushman, Paul N. Kokulis

[57] ABSTRACT

A strainer for separating liquid from a wood chips-liquid-mixture passed vertically through a feeding chute or a treating vessel comprises parallel vertical rods spaced to form straining slots. Every second strainer rod is stationary and the intermediate strainer rods which are pivoted at their upper ends, are united to form a unit that is moveable back and forth by means of a reciprocating drive means in order to prevent clogging of the strainer.

2 Claims, 3 Drawing Figures

STRAINER DEVICE IN A CONTINUOUS CELLULOSE DIGESTING PLANT

In strainer devices used in many places in continuous cellulose digesting plants for separating liquid from a fiber material-liquid-mixture, cleaning thereof after partial clogging can usually be performed merely during an interruption of the continuous operation of the plant. The object of the present invention is to eliminate said drawback in strainer devices of the kind comprising parallel vertical strainer rods. According to the invention, cleaning during operation will be possible due to the feature that strainer rods pertaining to a group comprising every second rod in a section of the strainer device, are displaceable in common substantially in the horizontal direction relatively to the intermediate rods that are stationary.

Figure 1:
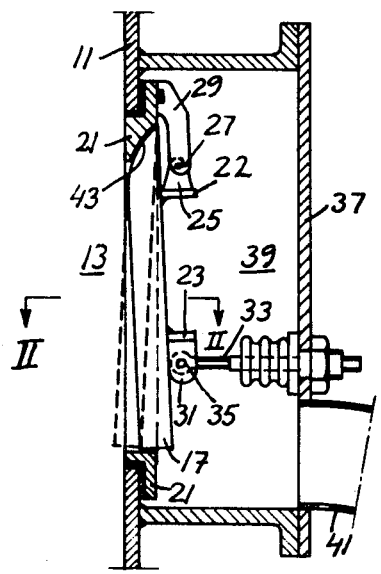

An embodiment of the strainer device according to the invention will be described more closely herein below with reference to the accompanying drawing. FIG. 1 is a vertical cross-sectional view of the device, FIG. 2 is a fragmentary enlarged horizontal cross-sectional view taken along the line II—II in FIG. 1, and FIG. 3 is a similar horizontal cross-sectional view of a somewhat modified embodiment of the strainer device.

In the drawing, 11 designates the shell of an upright cylindrical vessel in which a comminuted fiber material such as wood chips, a straw, or more or less digested cellulosic pulp, suspended or mixed into a liquid, moves continuously in the downward direction. The vessel may be a digester, an impregnation vessel or a vessel for the performance of some other treatment, and the liquid may be digesting liquor, washing liquid or liquid of any other kind serving for some chemical treatment or possibly merely for diluting or conveying of the fiber material.

The strainer device which in its entirety is designated by the numeral 13, is let into the shell of the vessel. Usually the device is composed of a number of sections distributed around the cirucmference of the vessel. Said sections may be placed at intervals or closely together so as to form a continuous strainer girdle. Each strainer section is composed of vertical strainer rods 15, 17 having a trapezoidal cross-section, which are placed parallelly to each other and are spaced so that they leave equally wide straining slots 19 between themselves. The strainer rods are inserted in a surrounding rectangular frame 21 which is attached and sealed to the vessel shell 11 and the upper and lower sides of which are curved so as to coincide with the curvature of the shell. Every second 15 of the strainer rods has its ends attached to or made integral with the frame 21. The remaining strainer rods, i.e. the intermediate rods 17, are rigidly secured to each other and form a group which is moveable relatively to the stationary strainer rods 15. Said moveable strainer rods are mutually connected to form a rigid unit, two transverse cross beams 22, 23 being attached, e.g. by welding, to the back faces of the rods. Either end of the upper beam 22 carries a lug 25 which by means of a pivot pin 27 is hinged to a suspension element 29 attached to the upper horizontal portion of the frame 21 and extending downwardly to a point located behind the upper end parts of the strainer rods. Attached to the center of the lower beam 23 is a pair of attachment lugs pivoted to the end of a rod 33 by means of a pin 35. The rod 33 extends through and is slidingly sealed to the back wall 37 of the filtrate collecting chamber 39. The other end of the rod 33 is connected to a driving means (not shown) for reciprocation of the rod. Usually the filtrate chamber 39 is closed and maintained under a pressure which is merely slightly reduced relatively to the pressure prevailing on the other side of the shell 11. Liquid passing through the straining slots 19 is collected in the chamber 39 and departs therefrom through the conduit 41 and is then either sewered or returned, depending upon the object of the straining operation.

Figure 2:
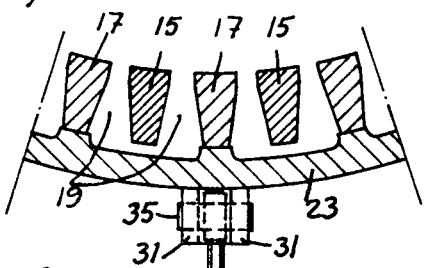
Figure 3:
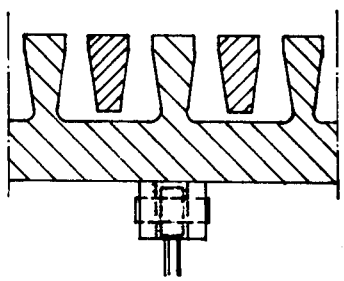

The moveable strainer rods 17 normally take the position shown in FIG. 2 where their inner faces are flush with or situated upon the same cylindrical surface as the inner faces of the fixed strainer rods 15. By means of the rod 33 the moveable rod set may be brought to swing about the pivots 27 forth and back from said position. In FIG. 1 the retracted position of the rods is shown in full lines and the projected position with dash lines. If the straining slots 19 are made of a width of 1 to 5 mm the free ends of the strainer rods may perform a stroke of about 5 to 15 mm in either direction from the center position. The frequency of the motion depends upon the working conditions and the object of the motion which, in addition to the prevention of clogging of the strainer by fiber particles, may be to break up any fiber mat collected and stuck against the strainer or to prevent the deposition of incrusts or similar upon the strainer rods. Moreover, the motion of the strainer rods will increase the filtering capacity in comparison to stationary strainers. The motion may be periodically interrupted or steady.

The upper ends of the moveable strainer rods are curved so to follow an arc 43 having its center on the line connecting the two pivots 27. Said curved end faces of the rods are placed with a very little interspace opposite to faces of the frame 21 curved in a similar manner. Therefore, there is no risk of particles penetrating into said interspace, the width of which is maintained constant during the swinging motion of the strainer rods.

In the modification shown in FIG. 3 the strainer device forms a flat straining face. Such a strainer device is suitable for insertion in the walls of a vertically extending vessel or passage having a rectangular cross-section. A very useful application of such a strainer device is in the vertical chute connected to the inlet of a rotary valve for feeding a chip-liquor-mixture into a continuous cellulose digester.

What is claimed is:

1. In a vessel adapted for continuously passing cellulosic material suspended in a liquid in the vertical downward direction, a strainer device for separating liquid from the cellulosic material comprising: a rectangular frame inserted in the wall of said vessel, a first set of rectilinear strainer elements extending vertically and in a spaced and parallel relation across the area of said frame and having their ends connected to opposite parts of said frame, a second set of rectilinear strainer elements extending in a spaced parallel relation and in a substantially vertical direction, an upper horizontal beam connected to the back side of the upper parts of the strainer elements of said second set and pivotally connected to the upper part of said frame so as to place the upper ends of the strainer elements of the second set in the spaces formed between the upper ends of the strainer elements of the first set, a lower horizontal beam connected to the back side of the lower parts of the strainer elements of the second set, and a driving means connected to said lower beam for swinging the strainer elements of the second set forth and back in the spaces formed between and along the strainer elements of the first set.

2. A strainer device for separation of liquid from a mixture of a comminuted fiber material and liquid passing vertically through an upright treating vessel comprising:

a rectangular frame adapted to be inserted in a wall of said vessel, a first set of rectilinear strainer elements extending vertically and in a spaced and parallel relation across the area of said frame and having their ends connected to opposite parts of said frame, a second set of rectilinear strainer elements extending in a spaced parallel relation and in a substantially vertical direction, an upper horizontal beam connected to the back side of the upper parts of the strainer elements of said second set and pivotally connected to the upper part of said frame so as to place the upper ends of the strainer elements of the second set in the spaces formed between the upper ends of the strainer elements of the first set, a lower horizontal beam connected to the back side of the lower parts of the strainer elements of the second set, and a driving means connected to said lower beam for swinging the strainer elements of the second set forth and back in the spaces formed between and along the strainer elements of the first set.

* * * * *